United States Patent [19]

Tufts

[11] Patent Number: 4,957,654

[45] Date of Patent: Sep. 18, 1990

[54] METHOD FOR MAKING A STORAGE STABLE BLEND OF A LONG CHAIN POLYOL AND A SHORT CHAIN DIOL BY INCORPORATING A BISPHENOL THEREIN AND THE RESULTING BLEND

[76] Inventor: Timothy A. Tufts, 9283 Riverside Dr., Powell, Ohio 43065

[21] Appl. No.: 229,522

[22] Filed: Aug. 8, 1988

Related U.S. Application Data

[63] Continuation-in-part of Ser. No. 36,642, Apr. 10, 1987, Pat. No. 4,786,435.

[51] Int. Cl.$^5$ .............................................. C09K 3/00
[52] U.S. Cl. .......................... 252/182.25; 252/182.27; 252/182.29; 528/76; 521/176
[58] Field of Search ..................... 252/182.25, 182.29, 252/182.27; 528/76; 521/176

[56] References Cited

U.S. PATENT DOCUMENTS

| | | | |
|---|---|---|---|
| 3,497,465 | 2/1970 | Kujawa et al. | 252/182.25 |
| 4,065,410 | 12/1977 | Schäfer et al. | 252/182.27 |
| 4,481,127 | 11/1984 | Yeater | 252/182.27 |
| 4,529,744 | 7/1985 | Wood | 252/182.25 |
| 4,649,163 | 3/1987 | Tairaka | 252/182.25 |

*Primary Examiner*—John Kight, III
*Assistant Examiner*—Dennis R. Daley

[57] ABSTRACT

Disclosed is a storage stable blend of a long chain polyol and a short chain diol wherein the diol is present in an amount whereby the diol and polyol form an incompatible blend. The blend is rendered storage stable by the addition of a compatibilizing amount of a phenol.

16 Claims, No Drawings

METHOD FOR MAKING A STORAGE STABLE BLEND OF A LONG CHAIN POLYOL AND A SHORT CHAIN DIOL BY INCORPORATING A BISPHENOL THEREIN AND THE RESULTING BLEND

This is a continuation-in-part of U.S. patent application Ser. No. 036,642, filed Apr. 10, 1987, now U.S. Pat. No. 4,786,435.

BACKGROUND OF THE INVENTION

The present invention relates to polyol blends such as are used in preparation of polyurethane molded parts and more particularly to the stabilization of such polyol blends and to improved polyurethane thermoset molded parts made therefrom.

Reaction Injection Moldings (RIM) are urethanes basically consisting of a polyol and a polyisocyanate, usually with an extender (e.g. a glycol or a diamine), optionally with a blowing agent (e.g. air), optional reinforcing material (e.g. glass, mica, etc.), wetting agents, and the like, which materials are high pressure injected through a mixing head into a pre-heated mold with usual post-molding baking thereafter applied. RIM urethanes can range from low modulus to very high modulus material parts, foamed on the interior but with a smooth surface. RIM urethanes are capable of being made into very large one-piece parts which are very light in weight. Typical present-day uses of RIM parts include, for example, automobile parts (e.g. bumpers, air deflectors, fenders, front ends, etc.), business machine housings, ski boots, office furniture, and a wide variety of products.

When a glycol extender is utilized in conjunction with a long chain polyol, such as a long chain polyoxyalkylene polyol, it has been reported that the blend suffers from storage stability by separating into two phases. Such phase separation created difficulties at the plant since mixing of the phase-separated blend must precede use of the blend whether such blend is utilized in RIM part formation or is utilized for other purposes. A variety of proposals aimed at rendering the mixture of long chain polyol and short chain diol compatible have appeared in the art. For example, U.S. Pat. No. 3,929,730 proposes to compatibilize the blend of a polyol and 1,4-butanediol by the addition of thiodiglycol or phenylenediethanolamine. U.S. Pat. No. 3,993,576 proposes to compatibilize mixtures of high molecular weight polyols and low molecular weight polyols by the addition of a butylene glycol or propylene glycol such as dibutylene glycol. U.S. Pat. No. 4,220,732 proposes to compatibilize the blend of polyol and glycol by utilizing as the glycol extender a combination of 1,4-butanediol and phenyldiethanolamine. U.S. Pat. No. 4,385,133 compatibilizes the polyol/glycol blend by employing as the polyol component a mixture of specific polyoxypropylene polyoxyethylene polyols of specific molecular weight and functionality. Other proposals involve the use of salts (potassium chloride or potassium acetate) or add a small amount of isocyanate for partial reaction and compatibilization of the blend.

Despite such advances in the art, need for effectively stabilizing the polyol/glycol blend while improving the final urethane product still is a desire of the art.

BROAD STATEMENT OF THE INVENTION

The present invention is addressed to compatibilizing an incompatible blend of a long chain polyol, such as a long chain polyoxyalkylene polyol, and short chain diol, such as a glycol. Such method comprises incorporating into the blend a stabilizing amount of a phenol.

Another aspect of the present invention is the resulting compatibilized blend of long chain polyol, short chain diol, and stabilizing phenol. Other aspects of the present invention will readily appear to those skilled in the art based upon the disclosure contained herein.

Advantages of the present invention include the ability to effectively and efficiently compatibilize a blend of polyol and glycol for making a practical storage stable product. Yet another advantage is the increased compatibility of phenol modified polyol blend and isocyanate which is achieved. A further advantage is the ability to make tough and rigid thermosets via the simultaneous polymerization of hydroxy/isocyanate functionality and ethylenic unsaturation functionality. These and other advantages of the present invention will be readily apparent from the description which follows.

DETAILED DESCRIPTION OF THE INVENTION

The three prime ingredients of the compatibilized blend are a long chain polyol, a short chain diol, and a compatibilizing phenol. Referring initially to the phenol, it has been found that phenols useful in the practice of the present invention include those of:

Formula I:

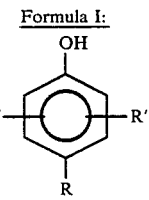

where R, R', and R" independently represent hydrogen, an alkyl group having from 1 to 20 carbon atoms, an aryl group having from 6 to 12 carbon atoms, an alkaryl group having from 7 to 20 carbon atoms, hydroxyl, hydroxyalkyl or hydroxy aryl;

and Formula II:

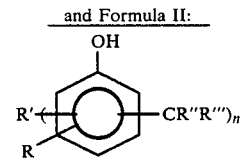

where R, R', R", and R''' independently represent hydrogen, an alkyl group having from 1 to 20 carbon atoms, an aryl group having from 6 to 12 carbon atoms, an alkaryl group having from 7 to 20 carbon atoms, hydroxyl, hydroxyalkyl or hydroxyaryl; and n is from 1 to 12. A representative phenol of Formula II is 4,4'-(1-methylethylidene) bisphenol.

The proportion of compatibilizing phenol is an amount effective for making the blend of long chain polyol and short chain diol storage stable or phase-stable. Such effective amount typically translates into a percentage of phenol ranging from about 5 to 20 and advantageously between about 7 and 15. Of course, mixtures of phenols may be utilized as is necessary, desirable, or convenient.

The foregoing description illustrates the presently preferred embodiment of the present invention wherein a long chain polyol and short chain glycol incompatible mixture is compatibilized by an phenol. It should be realized that addition of additional long chain polyols to such three-component mixture usually will affect the amount of phenol required for compatibilizing the incompatible blend. Thus, the weight ratio noted above is illustrative only and may be required to be adjusted to a significant degree on occasion.

Referring to the incompatible blend of long chain polyol and short chain diol, RIM technology requires levels of short chain diol to be such that the solubility level of the short chain diol in the long chain polyol is exceeded; thus the lack of storage or phase stability. The short chain diols most often are alkylene glycols typically ranging from about 2 to 8 carbon atoms in length. Alternatively, the short chain diols can be polyoxyalkylene glycols resulting from the reaction of an alkylene oxide (e.g. ethylene oxide, propylene oxide, or the like) with a short chain alkylene glycol. The level of short chain diol typically will be in excess of about 5 to 10 percent by weight of the long chain polyol when the resulting blend is intended for use in RIM technology.

Referring to the long chain polyols, such polyols typically are polyoxyalkylene polyols with average molecular weight ranging from between about 1,000 and 20,000 and include diols, triols, tetraols, and the like. The majority of oxyalkylene groups are oxyethylene or oxypropylene groups including mixtures thereof. Additional examples of such long chain polyols can be found in U.S. Pats. Nos. 4,385,133, 3,929,730, 3,993,576, and 4,227,032.

The phenol-compatibilized blend is storage or phase stable which means that the compatibilized blend exhibits single phase characteristics when stored at, for example, room temperature, for a time period of at least three months though typically storage of up to six months may be required. Additionally, the compatibilized blend exhibits thermal stability by exhibiting no significant increase in viscosity when subjected to storage at elevated temperature of, for example, about 100° C. Additionally the compatibilized blend can be subjected to multiple freeze-thaw cycles and still exhibit single phase characteristics wherein no significant increase of viscosity can be detected. The ability to exhibit single phase characteristics with no significant increase in viscosity renders the compatibilized blend "storage stable" for present purposes.

Any of the organic polyisocyanates commonly employed in the art of preparing polyurethanes can be employed in forming urethane parts from the compatibilized blend of the present invention. Such polyisocyanates often are polymeric isocyanates in order to reduce toxic vapors of isocyanate monomers. Further, alcohol-modified and other modified isocyanate compositions (e.g. thiocyanates) may be used. Polyisocyanates preferably will have from about 2–4 isocyanate groups per molecule in forming urethane parts. Suitable polyisocyanates for use in the present invention include, for example, hexamethylene diisocyanate, 4,4′-toluene diisocyanate (TDI), diphenylmethane diisocyanate (MDI), polymethyl polyphenyl isocyanate (Polymeric MDI or PAPI), m- and p-phenylene diisocyanates, bitolylene diisocyanate, triphenylmethane triisocyanate, tris-(4-isocyanatophenyl) thiophosphate, cyclohexane diisocyanate (CHDI), bis-(isocyanatomethyl) cyclohexane ($H_6$XDI), dicyclohexylmethane diisocyanate ($H_{12}$MDI), trimethylhexane diisocyanate, dimer acid diisocyanat dicylcohexylmethane diisocyanate, and dimethyl derivatives thereof, trimethyl hexamethylene diisocyanate, lysine diisocyanate and its methyl ester, isophorone diisocyanate, methyl cyclohexane diisocyanate, 1,5-napthalene diisocyanate, triphenyl methane triisocyanate, xylylene diisocyanate and methyl and hydrogenated derivatives thereof, polymethylene polyphenyl isocyanates, chlorophenylene-2,4-diisocyanate, and the like and mixtures thereof. Aromatic and aliphatic polyisocyanate dimers, trimers, oligomers,- polymers (including biuret and isocyanurate derivatives), and isocyanate functional prepolymers often are available as preformed packages and such packages are suitable for use in the present invention also.

The proportion of isocyanate groups to hydroxyl groups in the urethane-forming composition (isocyanate index) typically will range from about 0.8:1 to about 1.2:1, though such ratio can vary as is well known in this art. The two packages or streams which are utilized in forming RIM parts comprise the compatibilized blend as one stream and the polyisocyanate as the second stream. Increased polyol blend/isocyanate compatibility by dint of the phenol improves the molding operation (i.e. mixing of streams, e.g. in the mixing head). Each stream may contain appropriate catalytic amounts of catalysts which promote the reaction between hydroxyl groups and isocyanate groups, as well as catalytic amounts of free-radical initiators which promote the free-radical addition polymerization reaction involving the phenols. Urethane-promoting catalysts are well known in the art and include a wide variety of organic and inorganic salts of, and organometallic derivatives of, bismuth, lead, tin, and the like, as well as phosphine and tertiary organic amines. The art cited above contains exemplary lists of such catalysts and should be referred to for a further description thereof. Free-radical polymerization-initiators include, for example, benzoyl peroxide, methyl ethyl ketone peroxide, azo compounds and the like, or metal catalysts (driers) such as cobalt or the like. Promoters useful in this reaction include aromatic amines, metal salts, etc. The proportion of such promoters and catalysts are conventional as those in the art will appreciate, e.g. see Solomon, *The Chemistry of Organic Film Formers*, Robert E. Krieger Publishing Co., Huntington, N.Y. (1977).

Other commonly used additives for RIM products can be applied to the present invention provided that they are inert to the stability and reactivity of the composition. Such additives include, for example, fillers, blowing agents, reinforcing agents, dyes, pigments, moisture scavengers, diluents, surfactants, mold release agents, and the like.

The following examples show how the present invention has been practiced, but should not be construed as limiting. In this application, all units are in the metric system, and all percentages and proportions are by weight, unless otherwise expressly indicated. Also, all citations set forth herein are expressly incorporated here by reference.

EXAMPLES 1–18

Incompatible mixtures of long chain polyols and short chain diols were prepared using the stabilizers of the present invention compared with known stabilizers and with the absence of stabilizers. The formulations and test results are set forth below. The indicated amounts of the various components were mixed and heated if necessary, allowed to cool to room temperature and observed. Miscibility was indicated when a clear, homogeneous solution was attained with no phase separation.

TABLE I(A)

| Composition* | EXAMPLE NO. (g) | | | | |
|---|---|---|---|---|---|
| | 1 | 2 | 3 | 4 | 5 |
| Incompatible Mixture | | | | | |
| Propylene Glycol | 15 | 15 | 15 | 15 | 20 |
| Dipropylene Glycol | 10 | 10 | 10 | 10 | 10 |
| Polyol A | 15 | 15 | 15 | | |
| Polyol C | | | | 15 | 20 |
| Stabilizer | | | | | |
| Urea | 2 | 4 | 0 | | |
| N,N'bis(2-hydroxy-propyl)aniline | | | | 4 | |
| Tripropylene Glycol | | | | 10 | |
| Miscibility | No | No | No | No | No |

*Polyol C - TP4040 (BASF), a 4,000 molecular weight triol based on propylene oxide
Polyol B - SF 5505 (Texaco), a 5,000 molecular weight triol copolymer of propylene and ethylene oxide
Polyol A - Voranol 2148 (Dow Chemical), a 7,200 molecular weight triol based on propylene oxide
Polyol D - Niax 34-28 (Union Carbide), a 6,000 molecular weight triol modified with grafted polyol (styrene-co-acrylonitrile)

TABLE 1(B)

| Composition | EXAMPLE NO. (g) | | | | | |
|---|---|---|---|---|---|---|
| | 6 | 7 | 8 | 9 | 10 | 11 |
| Incompatible Mixture | | | | | | |
| Ethylene Glycol | | | 10 | | | 10 |
| Propylene Glycol | 30 | 15 | | 30 | 20 | |
| Dipropylene Glycol | 10 | 10 | 20 | 10 | | 20 |
| Polyol B | 27 | | 10 | 15 | 20 | 10 |
| Polyol D | | 15 | | | | |
| Stabilizer | | | | | | |
| Bisphenol A | 0 | 0 | | 1 | 2.2 | |
| 4-Nonyl Phenol | | | 0 | | | 2.5 |
| Miscibility | No | No | No | Yes | Yes | Yes |

TABLE 1(C)

| Composition* | EXAMPLE NO. (g) | | | |
|---|---|---|---|---|
| | 12 | 13 | 14 | 15 |
| Incompatible Mixture | | | | |
| Propylene Glycol | 20 | 20 | 20 | 15 |
| Dipropylene Glycol | 10 | 10 | 10 | 10 |
| Polyol A | 20 | | | |
| Polyol D | | 20 | | |
| Polyol C | | | 20 | 15 |
| Stabilizer | | | | |
| Bisphenol A | 3.2 | 2.6 | 14 | |
| Phenol | | | | 4 |
| Miscibility | Yes | Yes | Yes | Yes |

TABLE 1 (D)

| Composition* | EXAMPLE NO. (g) | | |
|---|---|---|---|
| | 16 | 17 | 18 |
| Incompatible Mixture | | | |
| Propylene Glycol | 15 | 15 | 15 |
| Dipropylene Glycol | 10 | 10 | 10 |
| Polyol C | 15 | 15 | 15 |
| Stabilizer | | | |
| Resorcinol | 4 | | |
| X | | 7 | |
| Y | | | 4 |
| Miscibility | Yes | Yes | Yes |

X - a phenol-formaldehyde resin prepared by $Zn^{+2}$ catalysis and containing methylene and methylol groups with 12% free phenol.
Y - a phenol formaldehyde novolac which is phenol free and contains no residual methylol groups (Alnovol PN320-American Hoechst)

EXAMPLE 19

The polyol composition of Example 12 was degassed on a rotary evaporator and 0.5 g. of N,N',N"-tris(dimethylaminopropyl) syn-hexahydrotriazine was added as catalyst. To 37.7 g of this mixture was added 108 g. of a modified liquid MDI product (carbodiimide modified, equivalent weight=144) which had been degassed. This mixture was then rapidly mixed by hand for 15 seconds and poured into a mold heated to 90° C. After three minutes a hard, tough sheet had formed and was removed from the mold.

I claim:

1. A method for making a storage stable blend of a long chain polyol and a short chain diol which blend phase separates under storage, which comprises incorporating into said blend from about 5 to 20 percent of 4,4'-(1-methylethylidene) bisphenol.

2. The method of claim 1 wherein the proportion of diol in said blend ranges from between about 20 and 75 percent and the proportion of polyol in said blend ranges from between about 80 and 25 percent by weight.

3. The method of claim 1 wherein said polyol comprises a polyoxyalkylene polyol having a molecular weight ranging between about 1,000 and 20,000.

4. The method of claim 3 wherein said polyol is a triol or tetraol.

5. The method of claim 1 wherein said diol comprises a $C_1$-$C_8$ alkylene glycol.

6. The method of claim 5 wherein said diol comprises a $C_1$-$C_8$ alkylene glycol.

7. In a process for the preparation of a polyurethane by reaction of an organic polyisocyanate and a blend comprising a long chain polyol and a short chain diol, said blend phase separating under storage, the improvement which comprises incorporating into said blend a stabilizing amount of 4,4'-(1-methylethylidene) bisphenol, and using said stabilized blend for forming said polyurethane.

8. The process of claim 7 wherein the bisphenol is present in a weight percent of from about 5 to 20.

9. The process of claim 7 wherein the proportion of diol in said blend ranges from between about 20 and 75 percent by weight and the proportion of polyol in said blend ranges from between about 80 and 25 percent by weight.

10. The process of claim 7 wherein said polyol comprises a polyoxyalkylene polyol having a molecular weight of between about 1,000 and 20,000.

11. The process of claim 7 wherein said diol comprises a $C_1$-$C_8$ alkylene glycol.

12. A storage stable blend which comprises: a long chain polyol, a short chain diol, and from about 5 to 20 percent of 4,4'-(1-methylethylidene) bisphenol.

13. The blend of claim 12 wherein the bisphenol is present in a weight percent of from about 5 and 20.

14. The blend of claim 12 wherein the proportion of diol in said blend ranges from between about 20 and 75 percent by weight and the proportion of polyol in said blend ranges from between about 80 and 25 percent by weight.

15. The blend of claim 12 wherein said polyol comprises a polyoxyalkylene polyol having a molecular weight of between about 1,000 and 20,000.

16. The blend of claim 12 wherein said diol comprises a $C_1$-$C_8$ alkylene glycol.

* * * * *